US012624894B2

(12) United States Patent
Son et al.

(10) Patent No.: US 12,624,894 B2
(45) Date of Patent: *May 12, 2026

(54) ELECTRODE DRYING SYSTEM AND ELECTRODE DRYING METHOD

(71) Applicant: LG Energy Solution, Ltd., Seoul (KR)

(72) Inventors: Jin Young Son, Daejeon (KR); Eun Hoe Jeong, Daejeon (KR); Sang Hoon Choy, Daejeon (KR); Shin Wook Jeon, Daejeon (KR); Young Kuk Ko, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 905 days.

This patent is subject to a terminal disclaimer.

(21) Appl. No.: 17/913,014

(22) PCT Filed: Nov. 25, 2021

(86) PCT No.: PCT/KR2021/017448
§ 371 (c)(1),
(2) Date: Sep. 20, 2022

(87) PCT Pub. No.: WO2022/114797
PCT Pub. Date: Jun. 2, 2022

(65) Prior Publication Data
US 2023/0143349 A1 May 11, 2023

(30) Foreign Application Priority Data

Nov. 27, 2020 (KR) ........................ 10-2020-0162423
Nov. 23, 2021 (KR) ........................ 10-2021-0162711

(51) Int. Cl.
*F26B 21/35* (2026.01)
*F26B 3/28* (2006.01)
(Continued)

(52) U.S. Cl.
CPC .............. *F26B 21/35* (2026.01); *F26B 3/283* (2013.01); *F26B 21/50* (2026.01); *H01M 4/0471* (2013.01); *F26B 3/30* (2013.01)

(58) Field of Classification Search
CPC ........ F26B 21/10; F26B 3/283; F26B 21/004; F26B 3/30; H01M 4/0471
(Continued)

(56) References Cited

U.S. PATENT DOCUMENTS 2,691,111 A * 10/1954 Minnich ................ G01R 29/22
324/727
5,775,002 A * 7/1998 Iwase ...................... F26B 13/16
34/620
(Continued)

FOREIGN PATENT DOCUMENTS

CN 106558663 A 4/2017
CN 207365594 U 5/2018
(Continued)

OTHER PUBLICATIONS

Extended European Search Report for European Patent Application No. 21898623.0 dated Oct. 5, 2023. 5 pgs.
(Continued)

*Primary Examiner* — Stephen M Gravini
(74) *Attorney, Agent, or Firm* — Lerner David LLP

(57) ABSTRACT

A system for drying an electrode includes: an oven which applies hot air and radiant heat to an electrode sheet; and a controller which receives information on drying standby time, and controls an amount of heat supplied into the oven. Herein, the controller controls to supply a reduced amount of heat to the oven during an initial drying time right after the supply of the electrode sheet after the drying standby time.

15 Claims, 7 Drawing Sheets

<u>200</u>

(51) Int. Cl.
    *F26B 3/30*         (2006.01)
    *F26B 21/50*      (2026.01)
    *H01M 4/04*       (2006.01)

(58) Field of Classification Search
    USPC ........................................................ 34/420
    See application file for complete search history.

(56) References Cited

U.S. PATENT DOCUMENTS

| | | | |
|---|---|---|---|
| 6,192,599 B1 * | 2/2001 | Bryant | F26B 13/10 |
| | | | 34/400 |
| 6,944,970 B2 * | 9/2005 | Silverbrook | B41J 15/044 |
| | | | 34/640 |
| 10,199,635 B2 * | 2/2019 | Ho | F26B 21/14 |
| 11,384,980 B2 * | 7/2022 | Triglia, Jr. | F26B 13/008 |
| 12,085,335 B2 * | 9/2024 | Lin | F26B 3/30 |
| 12,209,805 B2 * | 1/2025 | Kim | H01M 4/139 |
| 12,327,854 B2 * | 6/2025 | Asfha | H01M 8/04007 |
| 12,379,158 B2 * | 8/2025 | Chen | F26B 25/22 |
| 2011/0289790 A1 | 12/2011 | Kazama et al. | |
| 2014/0014037 A1 | 1/2014 | Watanabe et al. | |
| 2018/0229512 A1 | 8/2018 | Katagami | |
| 2023/0143349 A1 * | 5/2023 | Son | F26B 13/103 |
| 2023/0175776 A1 * | 6/2023 | Son | F26B 3/283 |
| | | | 34/443 |
| 2023/0243585 A1 * | 8/2023 | Kim | F26B 15/122 |
| | | | 34/552 |

FOREIGN PATENT DOCUMENTS

| | | | | | |
|---|---|---|---|---|---|
| CN | 115298848 A | * | 11/2022 | .......... | H01M 4/0471 |
| EP | 4084112 A1 | * | 11/2022 | .......... | G06T 7/0004 |
| ES | 3008015 T3 | * | 3/2025 | .......... | H01M 4/0471 |
| JP | S6391481 A | | 4/1988 | | |
| JP | 2008070108 A | | 3/2008 | | |
| JP | 2012209074 A | | 10/2012 | | |
| JP | 2013139889 A | | 7/2013 | | |
| JP | 2018130901 A | | 8/2018 | | |
| JP | 2019163903 A | | 9/2019 | | |
| JP | 2023513068 A | * | 3/2023 | ........... | H01M 4/139 |
| KR | 20090008086 A | | 1/2009 | | |
| KR | 20110038100 A | | 4/2011 | | |
| KR | 20120057437 A | | 6/2012 | | |
| KR | 20130051556 A | | 5/2013 | | |
| KR | 101286003 B1 | | 7/2013 | | |
| KR | 20160034796 A | | 3/2016 | | |
| KR | 20160037672 A | | 4/2016 | | |
| KR | 20170045564 A | | 4/2017 | | |
| KR | 20170103236 A | | 9/2017 | | |
| KR | 20180111325 A | | 10/2018 | | |
| KR | 20180125721 A | | 11/2018 | | |
| KR | 20200012329 A | | 2/2020 | | |
| KR | 20200089066 A | | 7/2020 | | |
| KR | 102186737 B1 | | 12/2020 | | |
| KR | 102227808 B1 | | 3/2021 | | |
| WO | 2014103786 A1 | | 7/2014 | | |
| WO | WO-2022114797 A1 | * | 6/2022 | .......... | H01M 4/0471 |

OTHER PUBLICATIONS

Chinese Search Report from 202180022194.3, dated Sep. 30, 2024, pp. 1-2.
International Search Report for PCT/KR2021/017448 mailed Mar. 4, 2022. 4 pgs.

* cited by examiner

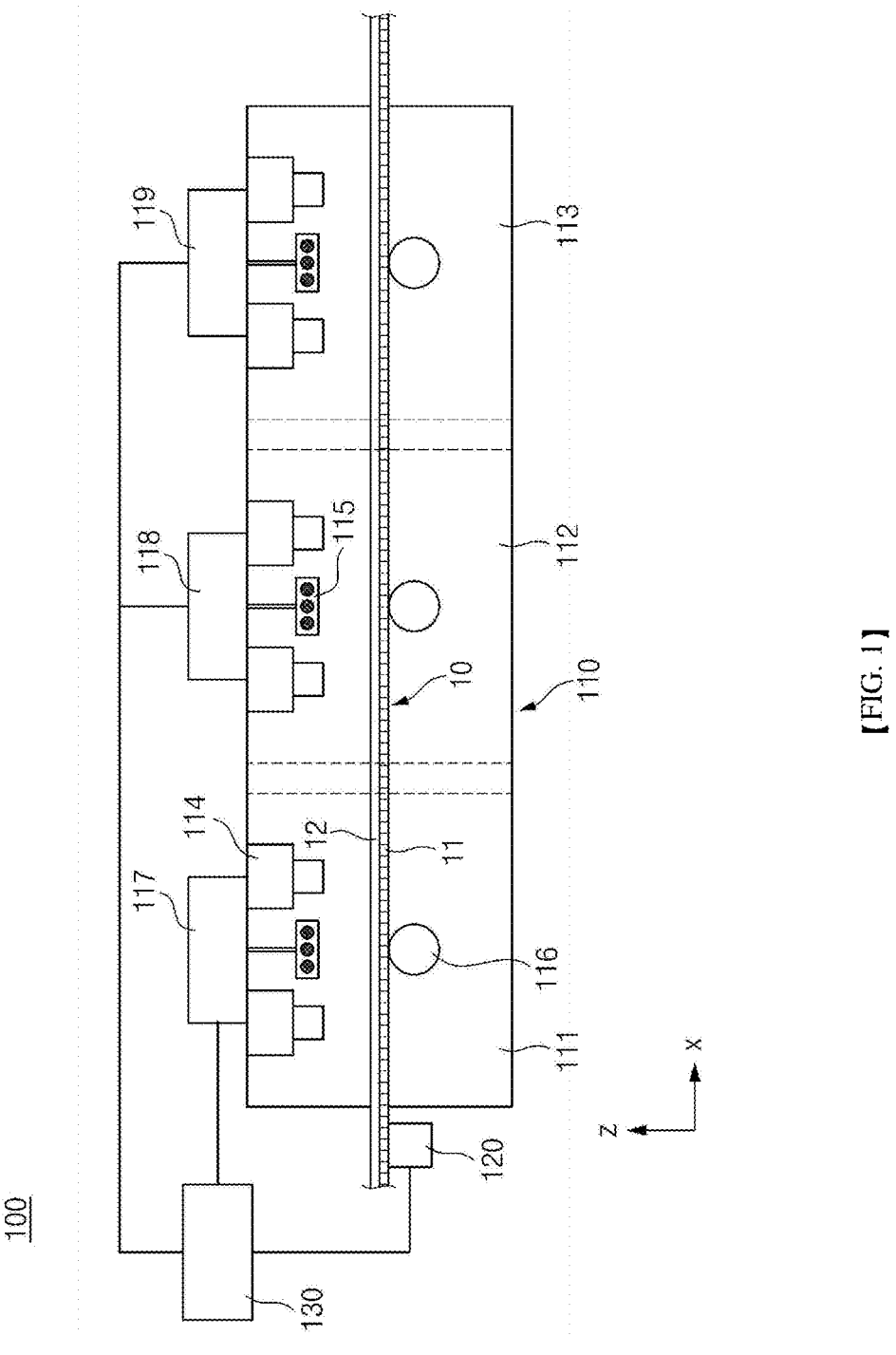
[FIG. 1]

【FIG. 2】
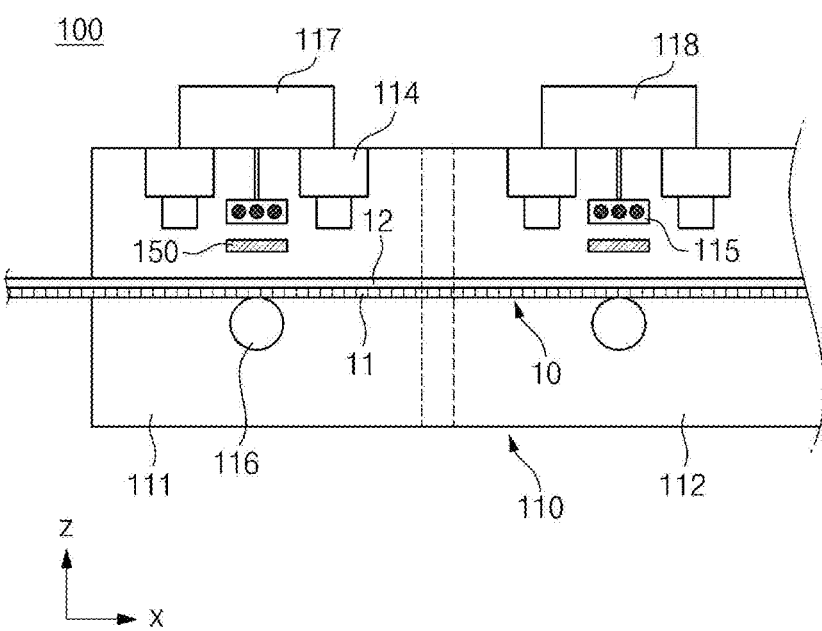

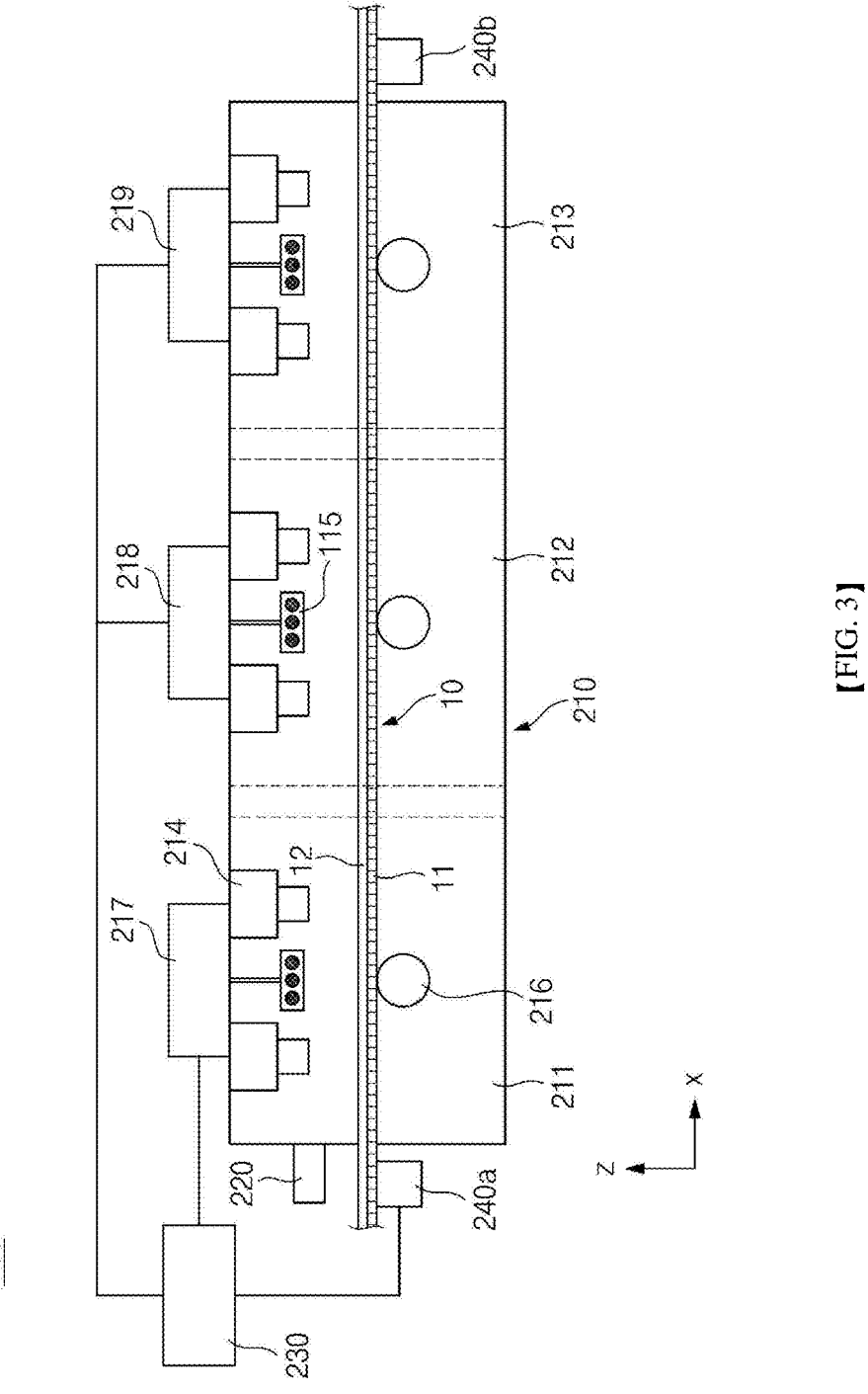
[FIG. 3]

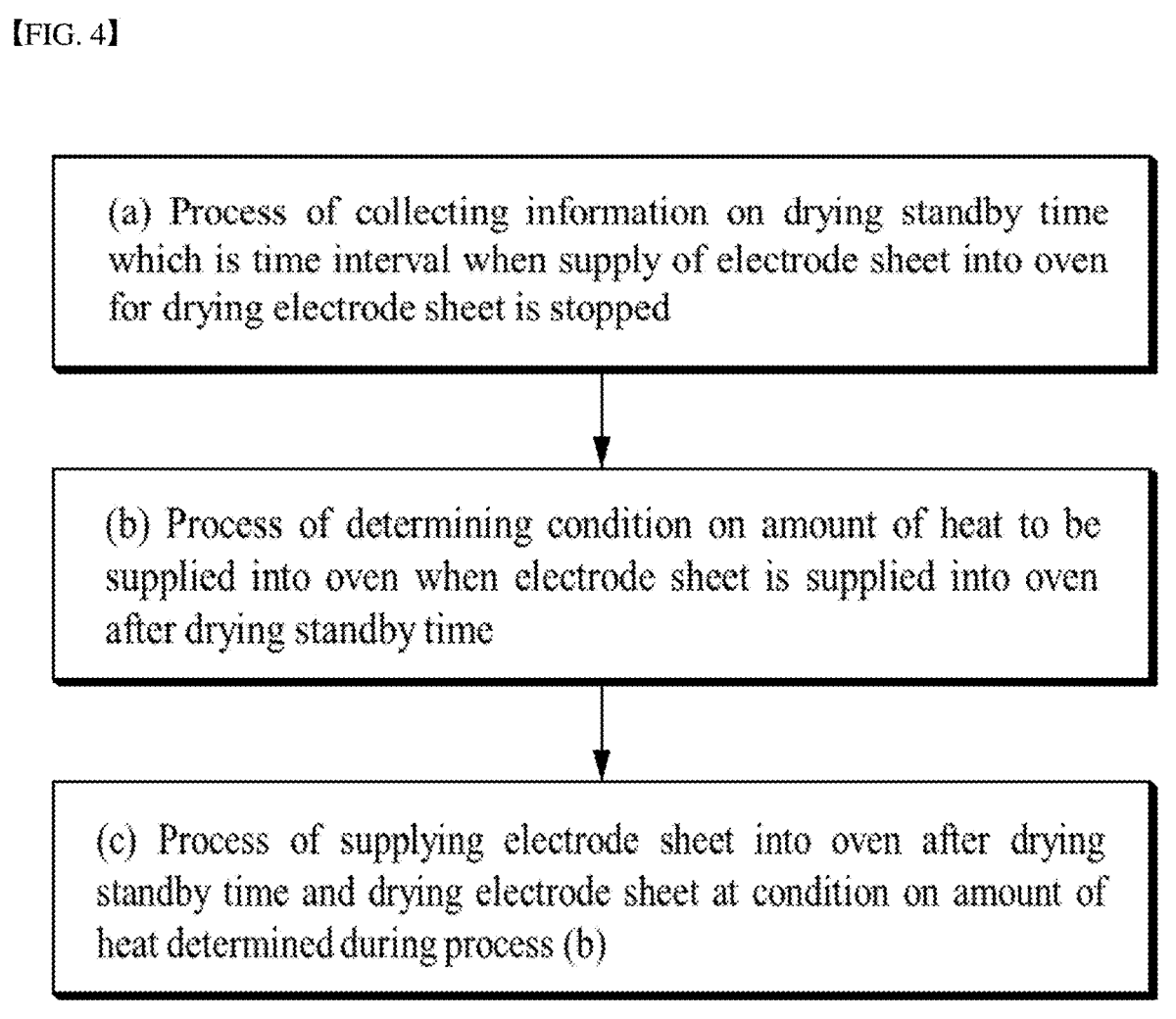

【FIG. 4】

(a) Process of collecting information on drying standby time which is time interval when supply of electrode sheet into oven for drying electrode sheet is stopped (b) Process of determining condition on amount of heat to be supplied into oven when electrode sheet is supplied into oven after drying standby time (c) Process of supplying electrode sheet into oven after drying standby time and drying electrode sheet at condition on amount of heat determined during process (b)

【FIG. 5】
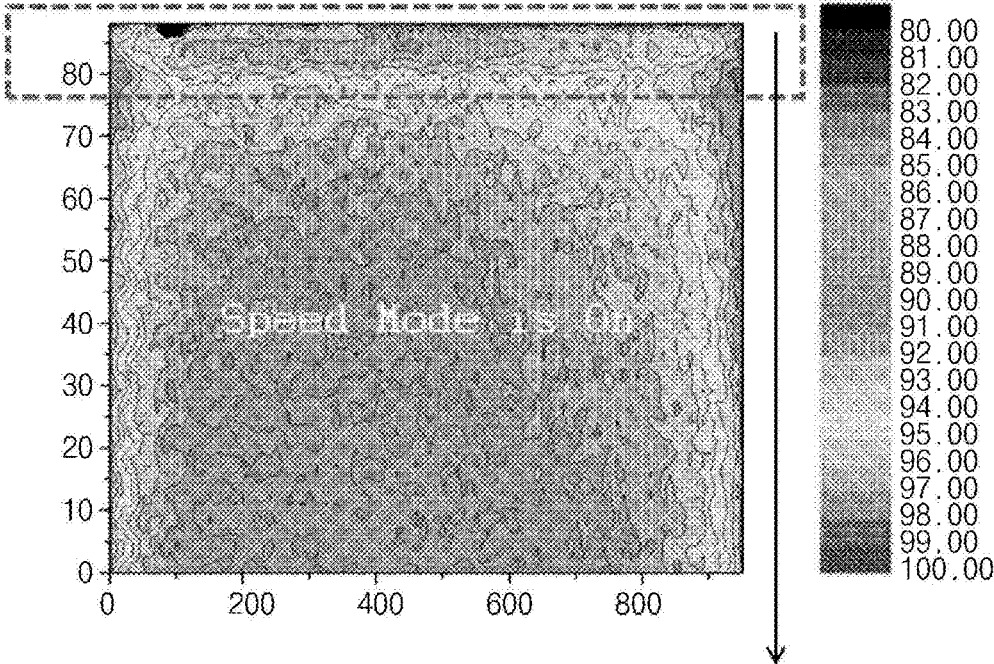

【FIG. 6】
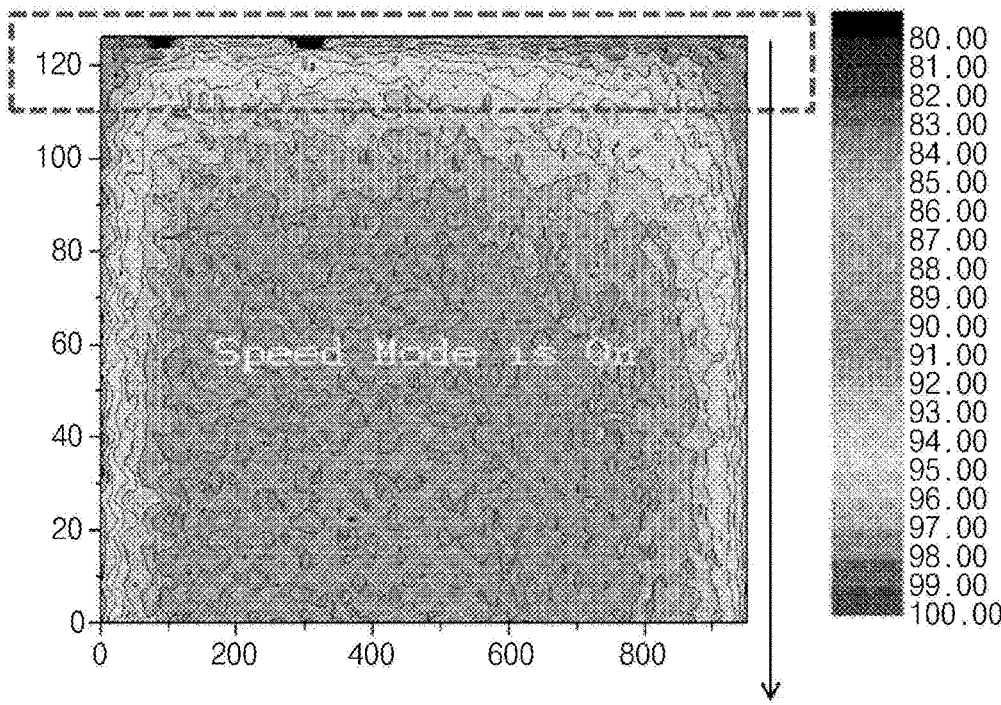

【FIG. 7】
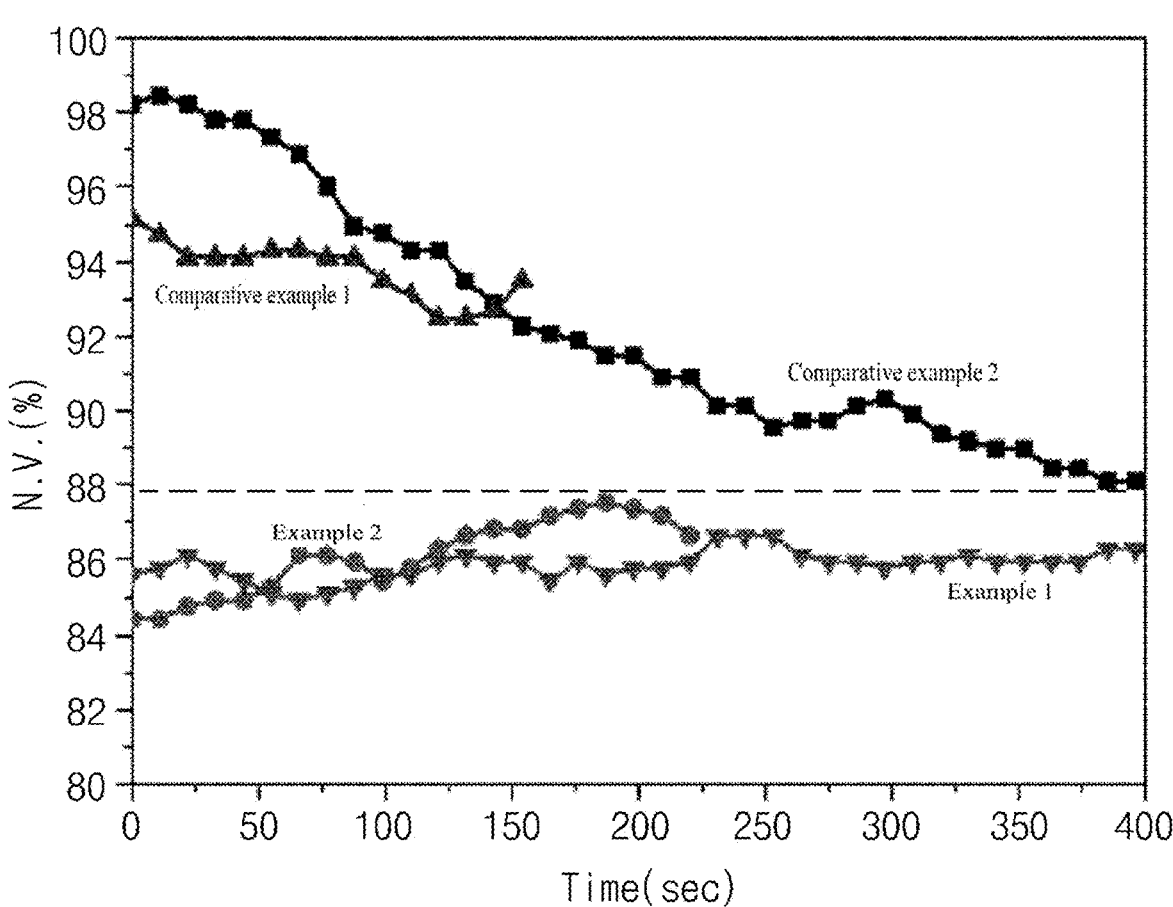

ELECTRODE DRYING SYSTEM AND ELECTRODE DRYING METHOD

CROSS REFERENCE TO RELATED APPLICATIONS

This application is a national phase entry under 35 U.S.C. § 371 of International Application No. PCT/KR2021/017448, filed on Nov. 25, 2021, which claims the benefit of priority based on Korean Patent Application No. 10-2020-0162423 filed on Nov. 27, 2020 and Korean Patent Application No. 10-2021-0162711 filed on Nov. 23, 2021, the disclosures of which are incorporated herein by reference.

FIELD OF INVENTION

The present invention relates to an electrode drying system and electrode drying method, and more particularly, to an electrode drying system and electrode drying method for suppress over-drying at the initial drying of an electrode sheet which is supplied into an oven right after drying standby time in the case that there is drying standby time when the electrode sheet is not supplied into the oven.

BACKGROUND

Recently, secondary batteries capable of charging and discharging have been widely used as energy sources of wireless mobile devices. In addition, the secondary battery has attracted attention as an energy source for electric vehicles, hybrid electric vehicles, etc., which are proposed as a solution for air pollution released from existing gasoline vehicles and diesel vehicles using fossil fuel. Therefore, due to such advantages, there are diverse applications using the secondary battery, and it is expected that the secondary battery will be applied to many other fields and products in the future.

Such secondary batteries may be classified into lithium ion batteries, lithium ion polymer batteries, lithium polymer batteries, etc., depending on the composition of the electrode and the electrolyte. There is an increased demand for lithium-ion polymer batteries which are less likely to leak electrolyte and which are easy to manufacture. In general, secondary batteries are classified into cylindrical batteries and prismatic batteries in which an electrode assembly is embedded in a cylindrical or rectangular metal can, depending on the shape of a battery case, and pouch-type batteries in which the electrode assembly is embedded in a pouch-type case of an aluminum laminate sheet.

The electrode assembly built into the battery case is composed of a positive electrode, a negative electrode, and a separator interposed between the positive and the negative electrodes. The electrode assembly is a power generating element, capable of charging and discharging. The electrode assembly is classified into a jelly-roll type wound, where the electrodes are long sheet-shaped and are coated with active materials with a separator interposed between the positive electrode and the negative electrode, and a stack type in which a plurality of positive electrodes and negative electrodes of a predetermined size are sequentially stacked while a separator is interposed therebetween.

The positive electrode and the negative electrode are formed by applying a positive electrode slurry containing a positive electrode active material and a negative electrode slurry containing a negative electrode active material to a positive electrode current collector and a negative electrode current collector, respectively, to thereby form a positive electrode active material layer and a negative electrode active material layer, respectively, followed by drying and rolling them.

At this time, the drying condition of the electrode influences the quality and physical properties of the electrode. Particularly, the adhesive force and the coupled level of the surface of the electrode can be significantly changed by controlling the deviation of the dryness for the width direction of the electrode and the time point when the drying is completed during the drying.

Further, the electrode sheet, on which an electrode slurry has been coated, goes through a drying process while moving through a drying section as a consecutive process, but there may be a time interval between an electrode slurry coating process and a drying process, and the surplus amount of heat is accumulated inside the oven during the drying standby time when the electrode sheet is not supplied into the drying section. In the case that an electrode sheet is supplied into the oven in a state that such a surplus amount of heat has been accumulated, a crack or a wrinkle may be generated on the electrode during the initial drying section due to the excessive amount of heat accumulated in the oven.

Particularly, a crack on the electrode due to over-drying in the initial drying section allows electrode powder to be generated, and the electrode powder is scattered along the convection of hot air in the oven, thereby contaminating the surrounding electrode and deteriorating the quality of the electrode. Hence, it is very important to prevent over-drying in the initial drying section of the electrode.

Therefore, there is a need for an electrode drying technology for preventing over-drying during the initial drying section.

DISCLOSURE

The present invention is believed to solve at least some of the above problems. For example, an aspect of the present invention provides an electrode drying system and electrode drying method for preventing a crack of an electrode by suppressing over-drying which may occur during the initial drying due to the surplus amount of heat accumulated in an oven for an electrode sheet which is supplied into the oven right after drying standby time in an electrode drying process including drying standby time.

A system for drying an electrode for solving the above problems according to the present invention includes: an oven which applies hot air and radiant heat to an electrode sheet; and a controller which receives information on drying standby time when a supply of the electrode sheet into the oven is stopped, and the controller determining and controlling an amount of heat supplied into the oven according to a length of the drying standby time, wherein the controller controls to supply a reduced amount of heat than a general supply amount of heat ($Q_t$) to the oven during an initial drying time right after the supply of the electrode sheet after the drying standby time.

In the electrode drying system according to an embodiment of the present invention, the controller controls to supply the general supply amount of heat ($Q_t$) into the oven after the initial drying time passes.

In the electrode drying system according to an embodiment of the present invention, the initial drying time (T) is time-sequentially divided into n (n≥2) time sections, and when each amount of heat, which is supplied into the oven at $T_1, T_2, T_3 \ldots T_n$, is defined as $Q_1, Q_2, Q_3 \ldots Q_n$, the controller controls the amount of heat supplied into the oven to satisfy a following relation:

$$Q_1 < Q_2 < Q_3 < \ldots < Qn \leq Q_t$$

In electrode drying system according to an embodiment of the present invention, the controller controls to reduce a ratio $(Q_1/Q_t)$ of the amount of heat $(Q_1)$ supplied to the initial time section $(T_1)$ to the general supply amount of heat $(Q_t)$ as the drying standby time increases.

In the electrode drying system according to an embodiment of the present invention, the oven includes at least one hot air nozzle, which applies convective heat by supplying hot air to the electrode sheet, and at least one heater, which applies radiant heat to the electrode sheet.

In the electrode drying system according to an embodiment of the present invention, the controller controls the amount of heat supplied into the oven in a manner that increases or decreases at least one of conditions including a temperature of hot air sprayed from the hot air nozzle, a speed of the hot air, and an output of the heater.

In the electrode drying system according to an embodiment of the present invention, the controller uniformly controls the amount of heat supplied into the oven for the entire oven.

The electrode drying system according to an embodiment of the present invention further includes an electrode sheet sensor which senses that the electrode sheet is not supplied into the oven and transmits information on the drying standby time to the controller.

The electrode drying system according to an embodiment of the present invention further includes a measuring unit which collects information on a dried amount of the electrode sheet and transmits the collected information to the controller. Herein, the controller determines a dried level of the electrode sheet according to the information on the dried amount received from the measuring unit and changes the amount of heat supplied into the oven in real time.

In the electrode drying system according to an embodiment of the present invention, the measuring unit collects information on at least one of a solid content and a surface temperature of the electrode sheet before and after passing through the oven.

In the electrode drying system according to an embodiment of the present invention, the measuring unit includes at least one of a web gauge and a temperature measuring instrument.

A method of drying an electrode sheet according to the present invention includes: (a) a process of collecting information on drying standby time which is a time interval when a supply of the electrode sheet into an oven for drying the electrode sheet is stopped; (b) a process of determining a condition on an amount of heat to be supplied into the oven when the electrode sheet is supplied into the oven after the drying standby time; and (c) a process of supplying the electrode sheet into the oven after the drying standby time and drying the electrode sheet at the condition on the amount of heat determined during the process (b). Herein, the process (b) includes determining the condition on the amount of heat to supply an amount of heat reduced than a general supply amount of heat $(Q_t)$ to the oven during the initial drying time.

In the method of drying an electrode sheet according to an embodiment of the present invention, the process (b) includes determining the condition on the amount of heat to supply the general supply amount of heat $(Q_t)$ into the oven after the initial drying time passes.

In the method of drying an electrode sheet according to an embodiment of the present invention, during the process (b), the initial drying time (T) is time-sequentially divided into n (n≥2) time sections, and when each amount of heat, which is supplied into the oven at $T_1$, $T_2$, $T_3$ . . . $T_n$, is defined as Q1, $Q_2$, $Q_3$ . . . $Q_n$, the amount of heat supplied into the oven is determined to satsify a following relation:

$$Q_1 < Q_2 < Q_3 < \ldots < Qn \leq Q_t$$

In the method of drying an electrode sheet according to an embodiment of the present invention, during the process (b), the condition of the amount of heat is determined so that a ratio $(Q_1/Q_t)$ of the amount of heat $(Q_1)$ supplied to the initial time section $(T_1)$ to the general supply amount of heat $(Q_t)$ is reduced as the drying standby time increases.

According to the present invention, in the case that there is drying standby time when the electrode sheet is not supplied into the oven, as the reduced amount of heat is controlled to be supplied to the electrode sheet which is supplied into an oven right after drying standby time, the over-drying is suppressed during the initial drying time, and accordingly, generation of a crack on the electrode sheet is prevented, thereby suppressing the contamination of the inside of the oven.

When the electrode drying system and electrode drying method of the present invention are applied, it is possible to reduce the electrode manufacturing costs by reducing the consumption of the amount of heat in the drying standby state of the electrode.

BRIEF DESCRIPTION OF THE DRAWINGS

FIG. 1 is a schematic diagram illustrating a structure of an electrode drying system according to an embodiment of the present invention.

FIG. 2 is a schematic diagram illustrating a structure of an oven according to an embodiment of the present invention.

FIG. 3 is a schematic diagram illustrating a structure of an electrode drying system in another embodiment of the present invention.

FIG. 4 is a flowchart illustrating an order of an automatic electrode drying control method according to the present invention.

FIG. 5 is a photograph obtained by photographing an electrode sheet dried according to an embodiment of the present invention using a thermal imaging camera.

FIG. 6 is a photograph obtained by photographing an electrode sheet dried according to a comparative example using a thermal imaging camera.

FIG. 7 is a graph showing the result of measuring a solid content according to the time of the dried electrode sheet according to the examples and comparative examples.

DETAILED DESCRIPTION

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail with reference to the drawings.

FIG. 1 is a schematic diagram illustrating a structure of an electrode drying system according to an embodiment of the present invention.

Referring to FIG. 1, a system 100 for drying an electrode according to the present invention includes: an oven 110 which can be divided into a plurality of drying sections 111, 112 and 113 along an x-axis which is the transfer direction of the electrode, and applies hot air and radiant heat to an electrode sheet 10; and a controller 130 which receives information on drying standby time when a supply of the electrode sheet into the oven 110 is stopped, and determines and controls an amount of heat supplied into the oven 110 according to a length of the drying standby time.

In the present invention, the drying standby time means a time interval at which an electrode sheet is not supplied into an oven due to various reasons about the process. The drying standby time may specifically be in the range of 30 seconds to 30 minutes, 30 seconds to 20 minutes, or 1 minute to 15 minutes.

The amount of heat is accumulated in the oven while the supply of the electrode sheet into the oven is stopped, and when the electrode sheet is supplied into the oven in a state that the surplus amount of heat has been accumulated, the overdrying of the electrode occurs due to the accumulated surplus amount of heat, thereby causing a crack on the electrode. Therefore, when there is drying standby time, it is necessary to control to temporarily reduce the amount of heat supplied into an oven.

As such, the electrode drying system of the present invention is used to suppress generation of a crack at an electrode due to the accumulated surplus amount of heat, and the controller 130 of the present invention controls to supply a reduced amount of heat than a general supply amount of heat $(Q_t)$ to the oven during an initial drying time right after the supply of the electrode sheet after the drying standby time. Herein, the general supply amount of heat $(Q_t)$ means the amount of heat which is generally supplied into an oven in the case that there is no drying standby time.

Further, in the present invention, the initial drying time may mean a predetermined time interval right after an electrode sheet is supplied into an oven, and may specifically mean a time interval until 60 minutes pass after the electrode sheet is supplied into the oven, a time interval until 30 minutes pass after the electrode sheet is supplied into the oven, a time interval until 20 minutes pass after the electrode sheet is supplied into the oven, a time interval until 10 minutes pass after the electrode sheet is supplied into the oven, or a time interval until 5 minutes pass after the electrode sheet is supplied into the oven. The length of the initial drying time when the amount of heat smaller than the general supply amount of heat $(Q_t)$ is supplied, may be changed according to the length of the drying standby time, and when the drying standby time is relatively long, the surplus amount of heat accumulated in the oven would be excessive, and accordingly, the initial drying time may become long. On the other hand, when the drying standby time is relatively short, the surplus amount of heat accumulated in the oven is relatively small, and accordingly, the initial drying time may become short.

Further, in the present invention, the x-axis means a direction in which an electrode is transferred, and the y-axis means a direction which is perpendicular to the transfer direction of the electrode on the electrode surface, as the width direction of the electrode. The z-axis corresponds to a direction in which hot air is sprayed or radiant heat is irradiated in an oven, as a direction perpendicular to the electrode surface.

In one specific example, the initial drying time (T) is time-sequentially divided into n time sections (n is equal to or greater than 2), and when each amount of heat, which is supplied into the oven at $T_1$, $T_2$, $T_3$ . . . $T_n$, is defined as $Q_1$, $Q_2$, $Q_3$ . . . $Q_n$, the controller controls the amount of heat supplied into the oven to satisfy a following relation:

$$Q_1 < Q_2 < Q_3 < \ldots < Q_n \leq Q_t$$

Namely, the controller of the present invention controls to supply a reduced amount of heat than a general supply amount of heat $(Q_t)$ to the oven during an initial drying time, gradually increase the supply amount of heat, and supply general supply amount of heat into the oven after the initial drying time passes.

In the drying system of the present invention, when there is no drying standby time, the generally set amount of heat $(Q_t)$ is supplied to th oven, but when there is drying standby time, the controller of the drying system of the present invention controls to supply a reduced amount of heat than a general supply amount of heat $(Q_t)$ to the oven during an initial drying time.

Specifically, for example, the initial drying time (T) may be divided into 4 time sections, and each time section is time-sequentially distinguished as $T_1$, $T_2$, $T_3$, and $T_4$. Further, on an assumption that the supply amount of heat corresponding to the time sections $T_1$, $T_2$, $T_3$, and $T_4$ are $Q_1$, $Q_2$, $Q_3$, and $Q_4$, the supply amount of heat corresponding to the initial time section $T_1$ is set to have a value smaller than the general oven supply amount of heat $Q_t$, and the controller controls the driving conditions such as the temperature of hot air, speed of hot air, and the output of the heater, so that the reduced amount of heat $Q_1$ may be supplied into the oven in the initial time section $T_1$.

Further, in $T_2$, which is the time section after the initial time section $T_1$, the amount of heat of $Q_2$ is set to be supplied into the oven. $Q_2$ is set to be greater than $Q_1$ and is set to be smaller than $Q_t$ which is the general supply amount of heat $(Q_t > \ldots > Q_2 > Q_1)$. The supply amounts of heat $Q_3$ and $Q_4$ corresponding to $T_3$ and $T_4$, which are the time sections after the $T_2$, are set as in the $Q_2$ $(Q_t > Q_4 > Q_3 > Q_2 > Q_1)$. Likewise, in the case that there is drying standby time, it is possible to suppress overdrying by supplying reduced amount of heat during the initial drying time, and gradually increasing the supply of the amount of heat over time.

In an embodiment of the present invention, the controller controls to reduce a ratio $(Q_1/Q_t)$ of the amount of heat $(Q_1)$ supplied to the initial time section $(T_1)$ to the general supply amount of heat $(Q_t)$ as the drying standby time increases.

For example, in the case that the drying standby time is 4 min. and in the case that the drying standby time is 2 min., the amount of heat $Q_1$, which is supplied during the initial time section $T_1$, is not set to be the same. The setting value of $Q_1$ is changed according to the length of the drying standby time.

In the above-described example, if $Q_1/Q_t$ is 75% when the drying standby time is 4 min., $Q_1/Q_t$ may be 85% when the drying standby time is 2 min. Since the surplus amount of heat accumulated in the oven increases as the drying standby time increases, $Q_1/Q_t$ is set to be smaller for attenuation thereof. The $Q_1/Q_t$ value may be changed according to the length of the drying standby time, and may specifically in the range of 50 to 90%, 55 to 85%, 60 to 75%, or 60 to 70%.

The controller uniformly controls the amount of heat supplied into the entire oven in controlling the reduced amount of heat to be supplied into the oven during the initial drying time. In the case that there is drying standby time when the electrode sheet is not supplied into the oven, the surplus amount of heat is accumulated throughout the entire section of the oven. Hence, in order to reduce the surplus amount of heat, it is desirable to uniformly perform the above-mentioned control for the entire oven.

Hereinafter, the configuration of the electrode drying system according to the present invention will be described in detail.

Referring to FIG. 1, an electrode drying system 100 according to the present invention includes an oven 110. The oven 110, which has a chamber shape, can provide a space where the electrode sheet 10 to be dried can move in the oven 110, and prevent heat escaping for the drying.

Further, the electrode sheet 10 may have a structure in which an electrode active material layer 12 is formed as a slurry for electrode formation including an electrode active material is coated on the current collector sheet 11. The electrode slurry may be applied to at least one surface of the current collector.

In this case, the current collector may be a positive electrode current collector or a negative electrode current collector, and the electrode active material may be a positive electrode active material or a negative electrode active material. In addition, the electrode slurry may further include a conductive material and a binder in addition to the electrode active material.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, $T_1$, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=, Al, Mg or $T_1$, X=F, S or N, and $-0.5 \leq x \leq 0.5$, $0 \leq y \leq 0.5$, $0 \leq z \leq 0.1$).

Examples of the negative electrode active material include carbon such as non-graphitized carbon and graphite carbon; metal complex oxide such as $Li_xFe_2O_3(0 \leq x \leq 1)$, $Li_xWO_2(0 \leq x \leq 1)$, $Sn_xMe_{1-x}Me'_yO_z$ (Me: Mn, Fe, Pb, Ge; Me': Al, B, P, Si, groups 1, 2, and 3 of the periodic table, halogen; $0 \leq x \leq 1$; $1 \leq y \leq 3$; $1 \leq z \leq 8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

Meanwhile, such an electrode slurry may be prepared by dissolving an electrode active material, a conductive material, and a binder in a solvent. The type of the solvent is not particularly limited as long as it is capable of dispersing an electrode active material, and either an aqueous solvent or a non-aqueous solvent may be used. For example, the solvent may be a solvent generally used in the art, such as dimethyl sulfoxide (DMSO), isopropyl alcohol, N-methylpyrrolidone (NMP), acetone, or water, and one of them alone or a mixture of two or more may be used. The amount of the solvent used may be such that the slurry can be adjusted to have an appropriate viscosity in consideration of the coating thickness, production yield, and workability of the slurry, and is not particularly limited.

Referring to FIG. 1, the oven 110 may be divided into a plurality of drying zones 111, 112 and 113, and each drying zone includes a hot air nozzle 114, which applies convective heat by supplying hot air to an electrode sheet 10, and a heater 115, which applies radiant heat to the electrode sheet 10. Referring to FIG. 1, the hot air nozzles 114 and the heaters 115 may be arranged at regular intervals along the transfer direction (MD direction, x direction) of the electrode sheet 10, and hot air or radiant heat is applied in a direction perpendicular to the electrode sheet 10. In FIG. 1, it is illustrated that the hot air nozzle 114 and the infrared heater 115 are positioned on the upper portion of the electrode sheet 10, that is, the lower surface of the ceiling of the oven 110, but when the electrode active material layer is formed on both surfaces of the current collector, the hot air nozzle 114 and the heater 115 may be positioned on the upper portion and the lower portion of the electrode sheet 10, respectively. Further, FIG. 1 illustrates a case that both the hot air nozzle and the heater are included as the drying means, but only one of the hot air nozzle and the heater may be included as the drying means.

On the other hand, the hot air nozzle 114 includes a main body unit and an injection unit. The main body unit constitutes the body of the hot air nozzle, and fixes the hot air nozzle 114 to the ceiling of the oven. In addition, the main body unit is empty inside and transmits hot air transmitted from a hot air supply source (not shown) to the injection unit. On the other hand, the injection unit is provided on the lower surface of the main body unit. The injection unit communicates with the main body unit, and an injection hole portion through which hot air is injected is formed on the lower surface of the injection unit. The injection hole portion may have a structure in which a plurality of pores are arranged at regular intervals.

Further, the heater 115 may be an infrared heater in a specific example of the present invention, and the infrared heater may include an infrared lamp which irradiates infrared rays to the electrode, and a cradle which supports the infrared lamp. The shape of the infrared lamp is not particularly limited, and for example, the rod-shaped lamp may be arranged in parallel along the transfer direction of the electrode while extending in the width direction of the electrode.

The hot air nozzles 114 and the heaters 115 may be alternately arranged in a direction in which the electrode sheet 10 is moved in order to evenly supply hot air and infrared rays to the surface of the electrode sheet 10. However, there is no particular limitation on the type of the arrangement, and the arrangement scheme of the hot air nozzles 114 and the infrared heaters 115 can be appropriately changed by one of ordinary skill in the art according to the drying condition.

The drying system of the present invention can control the amount of heat supplied into the oven in a manner that increases or decreases at least one of conditions including a temperature of hot air sprayed from the hot air nozzle, a speed of the hot air, and an output of the heater.

Further, at least one transfer roller 116 for transferring an electrode may be included in the oven 110. A plurality of transfer rollers 116 may be arranged at regular intervals along the transfer direction of the electrode sheet 10, and the transfer rollers 116 support the electrode sheet 10 during the drying process and transfer the electrode sheet 10 to the outside of the oven 110. Further, the dried amount of the electrode sheet can also be controlled by adjusting the rotation speed of the transfer roller.

The electrode drying system 100 according to the present invention may further include an electrode sheet sensor 120 which senses that the electrode sheet 10 is not supplied into the oven 110 and transmits information on the drying standby time to the controller 130. The electrode sheet sensor 120 may be installed at a portion near the entrance of the oven into which the electrode sheet is supplied. The type of the sensor 120 is not limited as long as it can sense whether an electrode sheet is supplied. Hence, the sensor may use a scheme of sensing the weight or an imaging camera scheme.

The controller 130 of the present invention is connected to a first driving controller 117, a second driving controller 118, and a third driving controller 119 which are installed at a first drying zone 111, a second drying zone 112, and a third drying zone 113, respectively, and accordingly, the controller 130 may order the reduction of the amount of heat supplied thereto. If the sensor 120 senses that an electrode sheet is not supplied into the oven, the sensor 120 transmits information on the drying standby time to the controller 130. The controller 130 receives information on the drying standby time, and determines the condition on the amount of heat to be supplied to the oven 110 and transmits the determined condition on the amount of heat to the driving controllers 117, 118 and 119 in the case that the electrode sheet 10 is supplied into the oven 110. As such, the drying controllers 117, 118 and 119 of the oven control the hot air nozzle 114 and the heater 115 to reduce the amount of heat supplied.

FIG. 2 is a schematic diagram illustrating a structure of an oven according to an embodiment of the present invention. Referring to FIG. 2, the electrode drying system 100 according to the present invention may further include a screen frame 150 for controlling the amount of the radiant heat emitted from the heater 115. The screen frame 150 is arranged between the heater 115 and the electrode active material layer 12, and may adjust the area of the surface of the electrode 10, which is exposed to radiant heat. The transfer of the radiant heat emitted from the heater 115 can be blocked or reduced by the screen frame 150. The electrode drying system according to the present invention can control the amount of heat supplied to the electrode 10 by adjusting the area exposed to the radiant heat in the electrode 10 through the screen frame 150 as necessary.

As described above, the oven 110 of the electrode drying system 100 according to the present invention may be divided into a plurality of drying zones 111, 112 and 113. In this case, at least one screen frame 150 is arranged between the electrode active material layer 12 and the heat 115 included in each drying section. Namely, a screen frame 150 may be arranged at each of all heaters 115 included in the oven 110.

At this time, the size and the number of screen frames 150 may be various set according to the drying process. Herein, the length in the electrode transfer direction (x axis direction) of the screen frame 150 may be set to be equal to or greater than the length in the electrode transfer direction (x axis direction) of the heater 115 in order to effectively block the infrared rays and prevent a deviation of the dryness for the electrode transfer direction. Further, a plurality of screen frames having a small width direction length are preferably arranged so that the electrode 10 can minutely adjust the area exposed to the radiant heat of the heater 115.

In the present invention, the screen frame 150 may be a plate-shaped member made of a material which does not transmit infrared rays. Specifically, the screen frame 150 may be made of any material which is not damaged under a high temperature environment in the oven and does not transmit radiant heat. Further, the screen frame 150 may be made of a material which does not transmit radiant heat, and alternatively, a metal or polymer material (which may or may not transmit infrared rays) may be coated with a material which does not transmit radiant heat to form the body of the screen frame 150. Examples of a material which does not transmit radiant heat include a glassy insulating material, an inorganic material such as a metal oxide, a carbon-based material, etc., but the present invention is not limited to these examples.

The shape of the screen frame 150 may be variously modified according to the drying conditions. The screen frame 150 may not form holes on the surface to block radiant heat. Alternatively, the screen frame 150 may form holes in a direction in which radiant heat is irradiated in order to only partly block the radiant heat.

FIG. 5 is a photograph obtained by photographing an electrode sheet dried according to an embodiment of the present invention using a thermal imaging camera, and FIG. 6 is a photograph obtained by photographing an electrode sheet dried according to a conventional electrode drying system using a thermal imaging camera. Referring to these drawings, in the electrode sheet, which has been manufactured by supplying the reduced amount of heat than the general supply amount of heat in the initial drying section according to the example of the present invention, the temperature of the surface of the electrode was lower, compared to FIG. 6, in the initial section (see the inside of the box formed of a dotted line). Therefore, the it is expected that the electrode drying system of the present invention can reduce generation of cracks by uniformizing the dried amount of the initially manufactured electrode.

FIG. 3 is a schematic diagram illustrating a structure of an electrode drying system in another embodiment of the present invention. Referring to FIG. 3, an electrode drying system 200 of the present invention includes: an oven 210 which provides a space where an electrode sheet 10 is moved and dried, and includes a drying means for applying hot air and/or radiant heat to the electrode sheet 10; a controller 230 which receives information on drying standby time when a supply of the electrode sheet into the oven is stopped, and determines and controls an amount of heat supplied into the oven according to a length of the drying standby time; an electrode sheet sensor 220 which senses that the electrode sheet 10 is not supplied into the oven 210 and transmits information on the drying standby time to the controller 230; a measuring unit 240 which collects information on a dried amount of the electrode sheet 10 having passed through the oven 210 and transmits the collected information to the controller 230. Herein, the controller 230 determines the dried level of the electrode sheet 10 based on the information on the dried amount received from the measuring unit 240 (240a and 240b), and controls the drying intensity of the oven 210 according to the determined dried level.

According to the electrode drying system, in the case that an electrode sheet is supplied into an oven after having drying standby time, a reduced amount of heat is supplied during the initial drying time to thereby prevent the initial overdrying, and the dried amount of the electrode is adjusted according to the dried level of the electrode in the drying process after the initial drying time passes, thereby allowing the dried level of the electrode to become uniform. Namely, the measuring units 240 (240a and 240b) can collect the information on the dried amount of the electrode sheet in real time, and the controller 230 can determine the dried level of the electrode sheet based on the collected information on the dried amount to thereby periodically adjust the dried amount of the electrode sheet according to the dried level of the electrode sheet, and accordingly, the dried level of the electrode can be controlled to become uniform.

The information on the dried amount includes information on at least one of a solid content and a surface temperature of the electrode sheet. The electrode drying system of the present invention determines the dried level of the electrode sheet through information on the solid content and/or temperature, which is collected through the measuring unit. The measuring unit may include at least one of a web gauge for measuring the loading amount of the electrode sheet and a temperature measuring instrument in order to collect information on the solid content and the surface temperature of the electrode sheet.

Referring to FIG. 3, the measuring units 240a and 240b include a web gauge which measures the loading amount of the electrode sheet, and the measuring units 240a and 240b may be installed at the entrance and the exit of the oven 210, respectively and measure the loading amount before drying the electrode sheet and the loading amount after drying the electrode sheet. The measuring unit may further include a calculation unit in order to derive the solid content, and the calculation unit may derive the solid content of the electrode active material layer 12 from the measured loading amount using a pre-entered calculation formula. A known formula in the related art can be used to derive the solid content from the loading amount.

When the dried level of the electrode sheet is excessive (overdrying), the solid content becomes greater than the reference value, and when the dried level of the electrode sheet is not sufficient, the solid content becomes smaller than the reference value. Hence, the solid content can become an indicator for recognizing the dried level of the electrode sheet. The controller 230 can determine the dried level of the electrode based on the information on the dried amount received from the measuring units 240a and 240b, and control the drying intensity of the oven 210 according to the determined dried level, to thereby adjust the dried amount of the electrode sheet in real time.

In order for the controller 230 to adjust the dried amount of the electrode sheet in real time, the measuring units 240a and 240b are set to periodically collect the information on the dried amount of the electrode sheet at regular time intervals, and the controller 230 determines the dried level of the electrode sheet whenever receiving information on the dried amount from the measuring units 240a and 240b and periodically controls the drying intensity of the oven.

Hereinafter, the process of controlling the dried amount by the controller 230 will be described in detail. The controller 230 may receive information on the loading amount before/after drying the electrode sheet, and/or the dried amount, such as the temperature of the surface of the electrode from the measuring units 240a and 240b, and receives the input of the reference value for determining whether the dried level of the electrode sheet is excessive or insufficient. Further, the controller 230 determines whether the dried level of the electrode sheet is excessive, insufficient, or appropriate by comparing the information on the dried amount with the reference value, and determines the method of controlling the drying intensity by quantitatively recognizing the excessive or insufficient dried degree by comparing the information on the dried amount with the reference value. When the dried level and dried amount of the electrode sheet are determined, the controller 230 can control at least one of the moving speed of the transfer roller, the heater and the hot air nozzle, to thereby adjust the dried amount of the electrode sheet.

The control of the drying intensity by the controller is periodically performed at regular time intervals. In one specific example, the controller may repeatedly control the drying intensity of the oven at the period of 5 to 20 minutes and preferably at the period of 6 to 15 minutes, but the present invention is not limited to these examples.

Further, the measuring unit is set to periodically collect the information on the dried amount of the electrode sheet at regular time intervals according to the drying intensity control by the controller. In one specific example, the measuring unit collects information on the dried amount for 1 to 5 minutes right before the time point when the control of the drying intensity by the controller is expected. Namely, the measuring unit does not promptly collect information on the dried amount of the electrode sheet after controlling the drying intensity of the oven, but it collects information on the dried amount of the electrode sheet after predetermined time passes from the performance of the control of the drying intensity by the controller. This is because it requires a predetermined time until the effect of dried amount adjustment according to the change of the drying intensity of the oven is shown.

The measuring unit set the average value or median value of the information on the dried amount collected during the predetermined time, as the representative value of the information on the dried amount, and transmit the value to the controller.

Further, the measuring unit may include a temperature measuring instrument capable of measuring the temperature of the surface of the electrode sheet. It is possible to more precisely control the amount of heat supplied into the oven by measuring the temperature in the oven.

In addition, the present invention provides an electrode drying method.

FIG. 4 is a flowchart showing the procedure of an electrode drying method according to the present invention.

Referring to FIG. 4, a method of drying an electrode sheet according to the present invention includes: (a) a process of collecting information on drying standby time which is a time interval when a supply of the electrode sheet into an oven for drying the electrode sheet is stopped; (b) a process of determining a condition on an amount of heat to be supplied into the oven when the electrode sheet is supplied into the oven after the drying standby time; and (c) a process of supplying the electrode sheet into the oven after the drying standby time and drying the electrode sheet at the condition on the amount of heat determined during the process (b). Herein, the process (b) includes determining the condition on the amount of heat to supply a reduced amount of heat than a general supply amount of heat ($Q_t$) to the oven during the initial drying time.

The process (b) is a process of setting the condition on the amount of heat of the initial drying time according to the length of the drying standby time when there is drying standby time. When setting the condition on the amount of heat, the initial drying time T is time-sequentially divided into n time sections (n≥2, n is an integer), the amount of heat ($Q_1$) smaller than the general supply amount of heat ($Q_t$) is supplied in the initial time section ($T_1$), and the amounts of heat ($Q_2 \ldots Q_n$), which are supplied into the time sections ($T_2 \ldots T_n$) thereafter, may be set to satisfy the following relationship.

$$Q_1 < Q_2 < Q_3 < \ldots < Q_n \leq Q_t$$

Namely, the process (b) includes determining the condition on the amount of heat to supply the general supply amount of heat ($Q_t$) into the oven after the initial drying time passes.

Further, the condition on the amount of heat is set so that a ratio ($Q_1/Q_t$) of the amount of heat ($Q_1$) supplied to the initial time section ($T_1$) to the general supply amount of heat ($Q_t$) is reduced as the drying standby time increases.

Specifically, the process (b) includes a process of differentially setting the condition on the amount of heat of the initial drying time according to the length of the drying standby time as shown in Table 1 below. The following table 1 shows the condition on the amount of heat supplied into an oven according to the drying standby time (1 min., 1 min. 30 sec., 2 min. 30 sec.). In Table 1, the length of the electrode sheet is the moving length of the electrode sheet which is supplied into the oven having drying standby time, and may be understood as time which has passed after the electrode sheet had been supplied into the oven, and the small length of the electrode sheet indicates the initial period of the drying time, and the large length of the electrode sheet indicates the later period of the drying time. Further, the numerical values shown on the row of the drying standby time of Table 1 mean the percentage ($Q_n/Q_t \times 100$) of the amount of heat supplied at the corresponding electrode sheet length on an assumption that the general supply amount of heat $Q_t$ is 100.

TABLE 1

| Length of electrode sheet | Drying standby time | | |
| --- | --- | --- | --- |
| | 1 min. | 1 min. 30 sec. | 2 min. 30 sec. |
| 1 | 85% | 80% | 75% |
| 100 | 90% | 87% | 84% |
| 200 | 95% | 94% | 93% |
| 300 | 100% | 100% | 100% |
| 400 | 100% | 100% | 100% |
| 500 to 1000 | 100% | 100% | 100% |

Referring to Table 1, in the case that the drying standby time is 1 min., the amount of heat to be supplied into the oven during the initial drying time (length of the electrode sheet is between 1 to 100) is set to be 85% of the general supply amount of heat, the amount of heat to be supplied into the oven during the following drying time section (length of the electrode sheet is between 100 to 200) is set to be 90% of the general supply amount of heat, the amount of heat to be supplied into the oven during the following drying time section (length of the electrode sheet is between 200 and 300) is set to be 95% of the general supply amount of heat, and the amount of heat to be supplied into the oven during the following drying time section (length of the electrode sheet is equal to or greater than 300) is set to be the general supply amount of heat. Likewise, according to the method of manufacturing an electrode of the present invention, when an electrode sheet is supplied into the oven having drying standby time, the amount of heat smaller than the general supply amount of heat is supplied during the initial drying time, and the amount of heat is gradually raised over time after the start of the supply of the electrode sheet into the oven, and the general supply amount of heat is supplied into the oven after the initial time has passed.

At this time, the amount of heat, which is set per time section, and the increase of the amount of heat are not limited and may be appropriately selected by one of ordinary skill in the art in consideration of various variables which influence the process, such as the material characteristic of the electrode slurry, the solid content of the electrode slurry, season, etc.

Further, referring to Table 1, in the case that the drying standby time is 2 min. 30 seconds, it is set to provide a further reduced amount of heat than in the case that the drying standby time is 1 min. during the initial drying time section (length of the electrode sheet: 1 to 100).

FIG. 7 shows a solid content according to time of an electrode sheet manufactured by applying a drying system and method according to the present invention. Examples 1 and 2 of FIG. 7 are graphs showing the result of measuring the solid content according to time of the electrode sheet which has been dried by setting the condition of the amount of heat according to the standby time as shown in Table 1 in the case that the drying standby time is 2 min. 30 sec. and 1 min., respectively. Referring to FIG. 7, in the electrode drying system according to the present invention, the reduced amount of heat is supplied during the initial drying time, and accordingly, the overdrying does not occur during the initial period. As such, the solid content is maintained at a low level even after some time passes, and the deviation is small.

Further, the comparative example 1 of FIG. 7 shows the solid content of the electrode sheet which has been dried by applying the condition on the amount of heat which has been set in the example 2 in the case that the drying standby time is 4 min. 30 sec., and the comparative example 2 of FIG. 7 shows the solid content of the electrode sheet which has been dried by the general supply amount of heat even in the initial drying time section unlike the present invention. Referring to FIG. 7, the initial solid content of comparative examples 1 and 2 was much greater than that of the examples 1 and 2, and a crack was generated in the electrode sheet of comparative examples 1 and 2. Even in the case of the comparative example 1, the reduced amount of heat was supplied during the initial drying time section, and the drying standby time was long, but the condition on the amount of heat was set to be the same as the case where the drying standby time was 1 min., and accordingly, the attenuation effect of the surplus amount of heat was not sufficient, thereby failing to sufficiently suppress the overdrying. Hence, in the present invention, it is important to set an appropriate condition on the amount of heat according to the length of the drying standby time.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

DESCRIPTION OF REFERENCE NUMERALS

100, 200: electrode drying system
10: electrode sheet

11: current collector
12: electrode active material layer
110, 210: oven
111, 211: first drying zone
112, 212: second drying zone
113, 213: third drying zone
114, 214: hot air nozzle
115, 215: infrared heater
116, 216: transfer roller
117, 217: first driving controller
118, 218: second driving controller
119, 219: third driving controller
120, 220: electrode sheet sensor
130, 230: controller
240*a*, 240*b*: measuring unit
150: screen frame

The invention claimed is:

1. A system for drying an electrode, the system comprising:
  an oven which applies hot air and radiant heat to an electrode sheet; and
  a controller which receives information on drying standby time when a supply of the electrode sheet into the oven is stopped, wherein the controller determines and controls an amount of heat supplied into the oven according to a length of the drying standby time, and
  wherein the controller controls to supply a reduced amount of heat than a general supply amount of heat ($Q_t$) to the oven during an initial drying time right after the supply of the electrode sheet after the drying standby time.

2. The system of claim 1, wherein the controller controls to supply the general supply amount of heat ($Q_t$) into the oven after the initial drying time passes.

3. The system of claim 1, wherein the initial drying time (T) is time-sequentially divided into n time sections, and when each amount of heat, which is supplied into the oven at $T_1$, $T_2$, $T_3$ . . . . $T_n$, is defined as Q1, $Q_2$, $Q_3$ . . . . $Q_n$, the controller controls the amount of heat supplied into the oven to satisfy a following relation:
  $Q_1 < Q_2 < Q_3 < . . . < Q_n < Q_t$, and wherein the n is equal to or greater than 2.

4. The system of claim 3, wherein the controller controls to reduce a ratio ($Q_1/Q_t$) of the amount of heat ($Q_1$) supplied to the initial time section ($T_1$) to the general supply amount of heat ($Q_t$) as the drying standby time increases.

5. The system of claim 1, wherein the oven includes at least one hot air nozzle, which applies convective heat by supplying hot air to the electrode sheet, and at least one heater, which applies radiant heat to the electrode sheet.

6. The system of claim 5, wherein the controller controls the amount of heat supplied into the oven in a manner that increases or decreases at least one of conditions including a temperature of hot air sprayed from the hot air nozzle, a speed of the hot air, or an output of the heater.

7. The system of claim 1, wherein the controller uniformly controls the amount of heat supplied into the oven.

8. The system of claim 1, further comprising an electrode sheet sensor which senses that the electrode sheet is not supplied into the oven and transmits information on the drying standby time to the controller.

9. The system of claim 1, further comprising a measuring unit which collects information on a dried amount of the electrode sheet and transmits the information collected on the dried amount of the electrode sheet to the controller,
  wherein the controller determines a dried level of the electrode sheet according to the information on the dried amount received from the measuring unit and changes the amount of heat supplied into the oven in real time.

10. The system of claim 9, wherein the measuring unit collects information on at least one of a solid content or a surface temperature of the electrode sheet before and after passing through the oven.

11. The system of claim 10, wherein the measuring unit includes at least one of a web gauge or a temperature measuring instrument.

12. A method of drying an electrode sheet, the method comprising:

(a) a process of collecting information on drying standby time which is a time interval when a supply of the electrode sheet into an oven for drying the electrode sheet is stopped;

(b) a process of determining a condition on an amount of heat to be supplied into the oven when the electrode sheet is supplied into the oven after the drying standby time; and (c) a process of supplying the electrode sheet into the oven after the drying standby time and drying the electrode sheet at the condition on the amount of heat determined during the process (b), wherein the process (b) includes determining the condition on the amount of heat to supply a reduced amount of heat than a general supply amount of heat $(Q_t)$ to the oven during an initial drying time.

13. The method of claim 12, wherein the process (b) includes determining the condition on the amount of heat to supply the general supply amount of heat $(Q_t)$ into the oven after the initial drying time passes.

14. The method of claim 13, wherein during the process (b), the initial drying time (T) is time-sequentially divided into n time sections, and when each amount of heat, which is supplied into the oven at $T_1, T_2, T_3 \ldots . T_n$, is defined as $Q_1, Q_2, Q_3 \ldots . Q_n$, the amount of heat supplied into the oven is determined to satisfy a following relation:

$Q_1 < Q_2 < Q_3 < \ldots < Q_n \leq Q_t$, and wherein the n is equal to or greater than 2.

15. The method of claim 14, wherein during the process (b), the condition of the amount of heat is determined so that a ratio $(Q_1/Q_t)$ of the amount of heat $(Q_1)$ supplied to an initial time section $(T_1)$ to the general supply amount of heat $(Q_t)$ is reduced as the drying standby time increases.

* * * * *